July 16, 1935.  W. KELLER  2,008,553
VEHICLE JACK
Filed Feb. 11, 1935
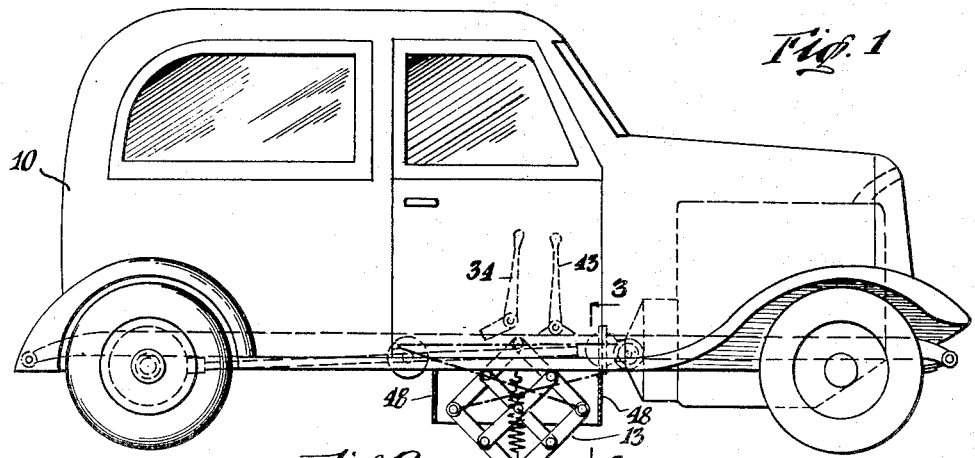
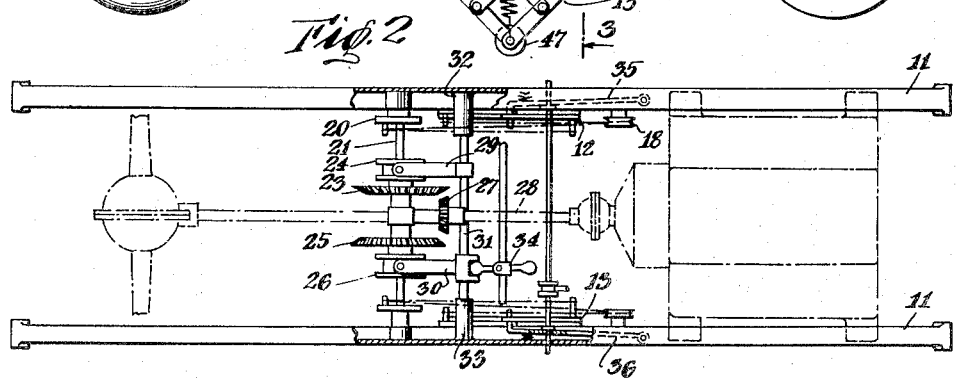
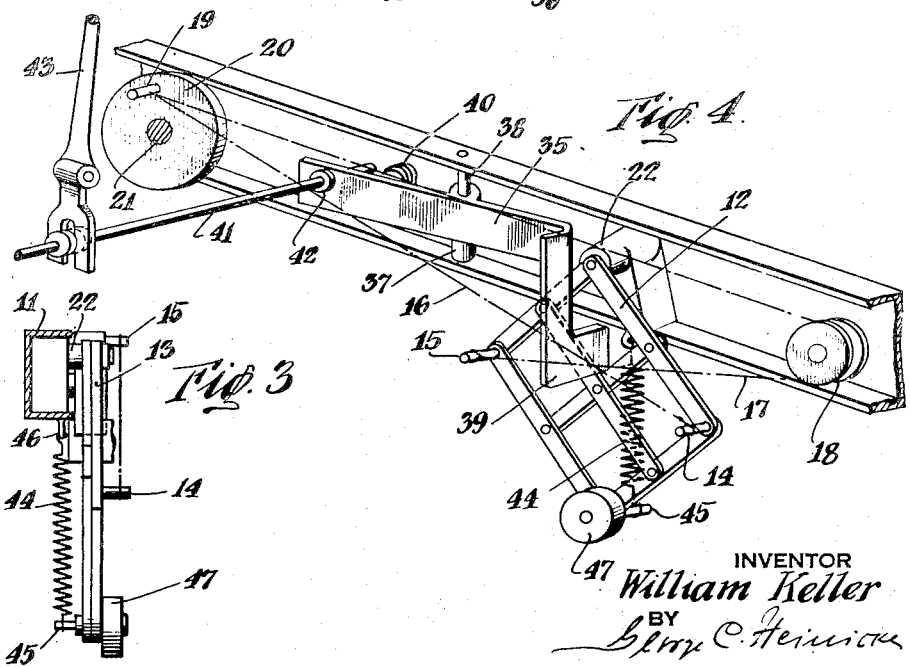
INVENTOR
William Keller
BY
George C. Heinrich
ATTORNEY Patented July 16, 1935

2,008,553

UNITED STATES PATENT OFFICE 2,008,553

VEHICLE JACK

William Keller, New York, N. Y.

Application February 11, 1935, Serial No. 5,885

3 Claims. (Cl. 254—86)

This invention relates to improvements in vehicle jacks preferably in devices for raising the chassis of automobiles from the ground to lift the wheels for the exchange or repair of tires etc., and it is the principal object of my invention to provide such a jack having the form of motor operated lazy tongs arrangements permanently attached to the chassis of the automobile and ready for instantaneous use.

Another object of my invention is the provision of lazy tongs arrangements constituting lifting jacks for vehicles, of a comparatively simple and inexpensive construction, yet durable and highly efficient in operation.

A further object of my invention is the provision of a lazy tongs jack equipped with means to effectively lock one or the other of the lazy tongs in their operating, ground engaging positions, while the lazy tongs upon release by the locking means are automatically returned into their folded position of rest.

A still further object of my invention is the provision of a lifting jack arrangement on either side of the car and equipped with means to allow the operation of either one of these arrangements selectively from the motor of the vehicle.

These and other objects and advantages of my invention will become more fully known as the description thereof proceeds and will then be more specifically defined in the appended claims.

In the accompanying drawing forming a material part of this disclosure:

Fig. 1 is a side elevation of an automobile equipped with a lifting device constructed according to my invention.

Fig. 2 is a bottom plan view thereof.

Fig. 3 is a section on line 3—3 of Figure 1.

Fig. 4 is a perspective detail view on an enlarged scale of the lifting mechanism on one side of the automobile.

As illustrated, an automobile 10 of any well known construction or type has attached to the inner or outer faces of the side frame bars 11 of its chassis the lazy tongs arrangements, generally indicated 12, 13.

To pins 14, 15, provided at the pivot points of two of the lazy tong frame bars, are attached the ends of cables 16, 17, the latter, 17, guided over a roller 18 on the frame bar 11 of the chassis and secured to a pin 19 laterally extending from and eccentrically arranged on an operating wheel 20 on a shaft 21 driven from the motor of the vehicle, while the end of cable 16 is also secured to pin 19.

The upper apexes of the upper bars of the lazy tongs arrangements are attached to bosses 22 suitably arranged on the frame bars 11.

The shaft 21 carries a bevel gear 23 on a coupling member 24 slidable on shaft 21, and a bevel gear 25 on a coupling member 26 also slidable on shaft 21.

Gears 23 and 25 are alternately brought into engagement with a bevel gear 27 on motor shaft 28 by the proper operation of the coupling members by means of arms 29, 30, having their outer ends secured to the coupling members 24, 26 while the inner ends are attached to a shaft 31 displaceable in sockets 32, 33 of the bars 11 and operated by the clutch operating lever 34.

Locking members 35, 36 are turnably attached intermediate their ends by means of their bosses 37 turning about pins 38 on bars 11. The outer ends of the members 35, 36 are substantially L-shaped, as indicated at 39 and have rounded edges on the small bar of the L to engage the lazy tongs arrangements in their operating position.

Springs 40 between the L bars 11 and the members 35, 36 hold the same in their lazy tongs locking position, while a rod 41 equipped with a collar 42 near the outer faces of members 35, 36 can be operated by means of a lever 43 to guide members 35, 36 into and out of their locking positions.

As soon as the lazy tongs arrangements are unlocked they are carried into their folded position of rest by means of the springs 44 secured at one end to a pin 45 on the lowermost pivot point of the lazy tongs arrangements and at their upper ends to eyes 46 on the bars 11.

Stationary rollers 47 are arranged at the lowest pivot point of the lazy tongs arrangements but may just as well be dispensed with while suitable clamps 48 depending from bars 11 may be provided to receive and protect the lazy tongs arrangement when not in use.

In use, if it is desired to life the chassis at one side, the bevel wheel is engaged by the proper operation of the clutch member 24 with the bevel gear 27 on the motor shaft. If now the motor is started, the disc 20 will rotate and the cables 16, 17 will extend the members of the lazy tongs frame to engage the ground and lift the chassis to an appropriate height from the ground determined by the length of the lazy tongs.

If now the spindle 41 is shifted to engage the locking member with the bars of the lazy tongs arrangement the same will be locked in its operating position.

After the work to be done on the vehicle is finished, the locking member is released again and the spring 44 will draw the lazy tongs back into their position of rest in the casing 48.

It will be understood that I have described and shown the preferred form of my invention as one example of the many possible ways to practically construct the same, and that I may make such changes in its general arrangement and in the construction of its minor details as come within the scope of the appended claims without departure from the spirit of my invention and the principles involved.

Having thus described my invention, what I claim as new and desire to secure by Letters Patent is:

1. In a jack for automobiles, a pair of lazy tongs arrangements attached at their upper apexes to the side bars of the automobile chassis, motor operated means to expand the lazy tongs arrangements to engage with their lower apexes the ground to lift the chassis, locking members pivoted intermediate their ends to the side bars of the automobile chassis to engage the lazy tongs, frame bars to hold the same in their expanded position, means to operate said locking means for locking the lazy tongs and for releasing the same, and springs attached to the lower apexes of the lazy tongs arrangements and to the chassis to automatically carry the lazy tongs into their position of rest, after each operation.

2. In a vehicle jack lazy tongs arrangements attached at their upper apexes to the side bars of automobiles, a motor operated shaft, a bevel gear on said shaft, a cross-bar on the chassis, bevel gears and coupling members thereon, means to engage one and the other of said bevel gears with the bevel gear on the motor shaft, cable drums on said cross-bar to be operated by the motor on the side of the vehicle on which the bevel gears are meshed with the motor shaft gear, to expand the lazy tongs on this side, means pivoted intermediate the ends thereof to the side bars of the automobile chassis for locking the lazy tongs in their expanded position, and means for returning the same into their position of rest after each operation.

3. In a jack for vehicles a pair of lazy tongs arrangements and means for locking the same in their expanded operating position, said means comprising spring controlled levers pivoted intermediate their ends to the chassis bars of the vehicle, substantially L-shaped members formed with said levers to engage the bars of said lazy tongs arrangements in their expanded state, means to operate said levers to swing them into their operating position and out of the same, and springs to contract the lazy tongs arrangements after each operation.

WILLIAM KELLER.